United States Patent Office 2,749,275
Patented June 5, 1956

2,749,275

THERAPEUTIC COMPOSITION OF 3,4 DIHYDROXY PHENYL ETHYLAMINE AND METHYLATING AGENT AND METHOD OF APPLYING

Mannie E. Borsook, Pasadena, Calif., assignor to Clinical Research Foundation, Los Angeles, Calif., a corporation of California No Drawing. Application January 26, 1952, Serial No. 268,465

8 Claims. (Cl. 167—65)

This invention relates to therapeutic compositions and to methods for administering the same.

The immediate physiological precursor of epinephrine is beta 3,4-dihydroxy phenyl ethyl amine. One of the trigger mechanisms to cause the anterior lobe of the pituitary gland to liberate its hormones is stimulation by epinephrine. As a result of the chain reaction, which includes the formation of epinephrine from beta 3,4-dihydroxy phenyl ethyl amine, epinephrine is liberated to stimulate the interior pituitary gland into liberating its hormones.

It is believed that in the event of multiple noxious stimuli and as a result of such stimuli, the content of epinephrine precursor and epinephrine in the animal organism is depleted, and not sufficient epinephrine is liberated to adequately stimulate the anterior pituitary gland, and thus the alarm reaction does not take place. Accordingly, one of the principal objects of this invention is to provide therapeutic compositions which, when administered, make available to the human body, as needed, the immediate physiological precursor of epinephrine.

Another object of this invention is to provide therapeutic compositions which are useful in the treatment of all conditions in which epinephrine has proved to be of value, and which additionally provide body stores of the precursor of epinephrine for use as needed.

The physiological precursor of epinephrine, beta 3,4-dihydroxy phenyl ethyl amine, is a very unstable compound, and in a matter of a few seconds' exposure, whether in solution, suspension or in air, is oxidized and decomposes. Accordingly, it is another important object of this invention to provide non-toxic stable salts of this compound which are readily assimilated by the body.

I have found that when the salts of beta 3,4-dihydroxy phenyl ethyl amine are injected or otherwise put into the tissues of the animal body, the free amine is liberated, and a part of the amine is rapidly oxidized and then methylated to form epinephrine. The remainder is stored in the adrenal medulla and in various ganglion cells and the liver, and is available when needed for conversion to epinephrine. In order to insure that there be adequate quantities of labile methyl groups for the methylation reaction, I have found it desirable to provide a methylating agent. Another object of this invention is, then, to provide a therapeutic composition which comprises salts of beta 3,4-dihydroxy phenyl ethyl amine and a methylating agent therefor.

Other objects and advantages of this invention it is believed will be readily apparent from the following detailed description of preferred embodiments thereof.

I have prepared and administered stable salts of beta 3,4-dihydroxy phenyl ethyl amine. For example, beta 3,4-dihydroxy phenyl ethyl amine hydrochloride having the structural formula:

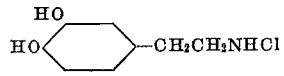

has been prepared in the following manner:

To each part of beta 3,4-methoxy phenyl ethyl amine was added 9½ parts of hydrobromic acid, and the solution was refluxed for six hours at 120°–130° C. The reaction mixture was cooled, precipitating beta 3,4-dihydroxy phenyl ethyl amine hydrobromide, and filtered. The precipitate was washed with cool 6N hydrochloric acid until no bromine or hydrobromic acid was detectable in the washings. The washed precipitate was then redissolved by heating in 6N hydrochloric acid, and the solution cooled to precipitate out beta 3,4-dihydroxy phenyl ethyl amine hydrochloride. This was filtered, and the precipitate washed with absolute isopropyl alcohol. The washed product was then dried in vacuo.

On a quantity production basis, the hydrochloride salt of the amine may be produced by reacting beta 3,4-methoxy phenyl ethyl amine directly with hydrochloric acid under elevated pressures of the order of 600–1,000 pounds per square inch.

Beta 3,4-dihydroxy phenyl ethyl amine hydrochloride is completely stable in a dry, cool state, not being subject to oxidation or deterioration. While in aqueous solution, the free amine is liberated, I have found the hydrochloride salt to be completely stable in weakly acid solutions and in oily suspensions or emulsions.

As has been indicated, in order to insure that there be adequate quantities of labile methyl groups for the methylation of beta 3,4-dihydroxy phenyl ethyl amine to epinephrine, it has been found desirable and necessary in some cases to administer a methylating agent in combination with the hydrochloride or other salt of the amine. The methylating agent, which comprises a methyl donating amino acid such as betaine, betaine hydrate, betaine hydrochloride, glycine, choline, methionine, serine or dimethylthetin, is present with the amine salt in equal molar quantities or greater.

While from one to five molar quantities of methylating agent per molar quantity of amine salt have been given, it is preferred to give five times as much methylating agent as amine salt. The methylating agent and amine salt may be administered separately, either by injection or by mouth, but they should be administered substantially simultaneously. Preferably, the two ingredients are mixed together in solution or in suspension. As an example, ten parts by weight of anhydrous betaine hydrate were mixed with one part by weight of beta 3,4-dihydroxy phenyl ethyl amine hydrochloride and the mixture dissolved in dilute hydrochloric acid having a pH of 4.0. The pH of the solutions should always be adjusted and maintained below approximately 5 to prevent premature liberation of the free amine. Solutions, suspensions and emulsions containing 100 mgs. or more of amine salt per cc. of solvent have been prepared and administered.

Other salts of the amine, such as the acetate and acid sulphate, have been prepared and administered. Likewise, the calcium, potassium and sodium acid salts of beta 3,4-dihydroxy phenyl ethyl amine hydrochloride have been prepared by reacting calcium hydroxide, potassium hydroxide and sodium hydroxide, respectively, with the hydrochloride salt, using two moles of hydrochloride salt per mole of the base and maintaining the pH of the product solution below 6. I have found the calcium, potassium and potassium acid salts to be much less soluble and less stable but somewhat more prolonged in action than the hydrochloride salt itself.

I have given by mouth with no toxic effects, in weak hydrochloric acid solution, the hydrochloride salt of the amine with from one to five moles, per mole of salt, of methylating agent, the amount of hydrochloride salt being up to twenty times the equivalent of the normal amounts of phenyl groups found in the urine.

By parenteral injection, I have given from $\frac{1}{20}$ mg. to 4 mgs. per kilo of body weight with from two to ten times as much of betaine hydrate four to five times daily for the abolition of acute asthmatic and other allergic states. I have found in experiments with animals that the action of a single dose of the hydrochloride salt is prolonged for several hours.

In order to obtain a more prolonged action and to substantially increase the body stores of the amine, I have given substantially larger amounts. As much as 10 mgs. of amine hydrochloride per kilo of body weight with 100 mgs. of betaine hydrate per kilo of body weight has been given by injection or by mouth.

It has been found that the action is prolonged by preparing the hydrochloride salt, with or without the methylating agent, in the form of an emulsion or a suspension. For example, one part by weight of beta 3,4-dihydroxy phenyl ethyl amine hydrochloride and eight parts of betaine hydrochloride were suspended in a mixture of aluminum monostearate in peanut oil. Other vegetable oils may be used for the suspending medium, and likewise, dispersing agents other than aluminum monostearate may be used. The proportions of amine hydrochloride to suspending agent were of the order of 50–100 mgs. per cc. The use of suspensions or emulsions tends to permit the amine to be more slowly absorbed.

Additionally, a gel was prepared comprising gelatin, and the amine hydrochloride, with sufficient hydrochloric acid to maintain the pH below 5.

The above described salts of beta 3,4-dihydroxy phenyl ethyl amine and compositions containing the same have been found to be of value in treatment of shock as they slow the pulse, raise the blood pressure and cause contraction of the erector pilae muscles which results in the erection of the hair of the skin, goose pimpling, warming of the skin, etc. These salts are also of value in acute and chronic asthma, hay fever, urticurial eruptions, various allergies, and in all other conditions where the administration of epinephrine systemically has proved to be of value. The compounds and compositions herein disclosed have been found to be nontoxic. I have injected animals with as much as 200 mg. per kilo of body weight of the amine salts with and without a methylating agent without any toxic effect.

While I have fully described preferred embodiments of my invention, it is to be understood that I do not wish to be limited to the details herein set forth, but my invention is of the full scope of the appended claims.

I claim:

1. A therapeutic composition comprising a salt of beta 3,4-dihydroxy phenyl ethyl amine and at least an equal molar quantity, per mole of said salt, of a methylating agent selected from the group consisting of betaine, betaine hydrate, betaine hydrochloride, glycine, choline, methionine, serine, and dimethylthetin.

2. A therapeutic composition comprising a salt of beta 3,4-dihydroxy phenyl ethyl amine and between about one and about five moles, per mole of said salt, of a methylating agent selected from the group consisting of betaine, betaine hydrate, betaine hydrochloride, glycine, choline, methionine, serine, and dimethylthetin.

3. A therapeutic composition comprising beta 3,4-dihydroxy phenyl ethyl amine hydrochloride and at least an equal molar quantity, per mole of said salt, of a methylating agent selected from the group consisting of betaine, betaine hydrate, betaine hydrochloride, glycine, choline, methionine, serine, and dimethylthetin.

4. A therapeutic composition comprising beta 3,4-dihydroxy phenyl ethyl amine hydrochloride and between about one and about five moles, per mole of said amine hydrochloride, of a methylating agent selected from the group consisting of betaine, betaine hydrate, betaine hydrochloride, glycine, choline, methionine, serine, and dimethylthetin.

5. A therapeutic composition comprising a salt of beta 3,4-dihydroxy phenyl ethyl amine and between about one and about five moles, per mole of said salt, of betaine hydrate.

6. A therapeutic composition comprising beta 3,4-dihydroxy phenyl ethyl amine hydrochloride and between about one and about five moles, per mole of said salt, of betaine hydrate.

7. A method of therapeutic treatment comprising the step of introducing into the human body beta 3,4-dihydroxy phenyl ethyl amine hydrochloride and between about one and above five moles, per mole of said amine hydrochloride, of a methylating agent selected from the group consisting of betaine, betaine hydrate, betaine hydrochloride, glycine, choline, methionine, serine, and dimethylthetin.

8. A method of therapeutic treatment comprising the steps of introducing into the human body a salt of beta 3,4-dihydroxy phenyl ethyl amine and at least an equal molar quantity, per mole of said salt, of a methylating agent selected from the group consisting of betaine, betaine hydrate, betaine hydrochloride, glycine, choline, methionine, serine, and dimethylthetin.

References Cited in the file of this patent

UNITED STATES PATENTS

| | | |
|---|---|---|
| 2,283,817 | Martin | May 19, 1942 |

FOREIGN PATENTS

| | | |
|---|---|---|
| 247,906 | Germany | June 10, 1912 |

OTHER REFERENCES

Beard et al.: Jour. Biochemistry (Japan) 1938, vol. 28, No. 3, pp. 430–432.

Bueloir et al.: J. Am. Pharm. Assn. Sci. Ed., vol. 33, pp. 270–274 (August 1944).

Woodward: Armed Forces Medical Journal, vol. 5, No. 9, pp. 1300–1308, September 1949.

Wyss: Merck Report, April 1945, pp. 16 to 18.

Goodman et al.: The Pharmacological Basis of Therapeutics, MacMillan, New York, 1941, pp. 397–8.

Pincus: The Hormones, vol. II, Academic Press Inc., New York, 1950, pp. 621–3.

Selye: Textbook of Endocrinology Acta Endocrinologies, University of Montreal, Canada, 1947, pp. 107–8.

Shafiroff: Science, Nov. 14, 1947, vol. 106, pp. 474–5.